United States Patent Office 2,798,839
Patented July 9, 1957

2,798,839

PRODUCTION OF L-GLUTAMIC ACID

Hsing T. Huang, Fresh Meadows, N. Y., and Carl V. Smythe, Moorestown, N. J., assignors to Rohm & Haas Company, Philadelphia, Pa., a corporation of Delaware No Drawing. Application May 27, 1954,
Serial No. 432,905

19 Claims. (Cl. 195—47)

This invention deals with a method for preparing L-glutamic acid or its derivatives by subjecting an ammonium citrate to the action of an enzyme system which acts at each stage of chemical change from citrate to glutamate. An advantageous system of this type is developed by several kinds of bacteria, particularly by bacteria of the genus Pseudomonas.

Transamination of $\alpha$-ketoglutaric acid has been effected with an aminocarboxylic acid, such as aspartic acid, under the influence of a transaminase. It is also known that the amino group of glutamic acid can be transferred by enzymatic action. Chemical synthesis of glutamic acid has been accomplished, but the products are always a DL mixture, whereas L-glutamic acid is that desired. From the findings of the art it could not be accurately ascertained whether L-glutamic acid could be formed in appreciable yields by enzymatic action on readily available substrates.

We have discovered that L-glutamic acid can be prepared through treating an aqueous solution containing ammonium ions and citrate ions at a pH from 6 to 8.5 with the enzyme system developed in cells of various bacteria, desirably those of the Pseudomonas genus, particularly of *Pseudomonas fluorescens* is readily obtained from the United States Department of Agriculture, Fermentation Division of the Northern Regional Research Laboratory at Peoria, Illinois, where it is deposited under No. B–334. The yield of L-glutamic acid is improved by carrying out the enzymatic process anaerobically and also by adding to the reaction system a coenzyme preparation as from liver or from yeast. These coenzymes are identifiable by the fact that they are reversibly oxidizable and reducible as the known nicotinic acid-containing coenzymes are.

The solution contains from about 0.01 to about 0.25 molar concentration of citrate preferably from 0.05 to 0.15 molar, and ammonium ions in a proportion of at least one mole thereof per mole of citrate. The pH of the solution is adjusted with ammonia and/or an alkali metal base to a pH value of 6 to 8.5. In a particularly useful state there are two moles of ammonia used or ammonium ions at hand and one mole of sodium or potassium ions per mole of citrate. There may desirably be present low concentrations of magnesium, manganese, or iron salts, phosphate ions, or other ions which are known to be helpful in enzymatic processes. The proportion of such elements should increase as the concentration of citrate is increased. The temperature of the solution should be between 20° and 40° C.

To this solution is added a suspension of cells of a bacterium which will grow on either citrate or glutamate, such as the Pseudomonas as the sole source of carbon, such as the Pseudomonas genus together with, if desired, a coenzyme. The mixture is agitated, preferably in the absence of oxygen. During the course of 10 to 100 hours citrate is substantially converted to glutamate. Glutamate values are recovered, usually through conversion of the salt form to acid and separation of acid by absorption on an ion-exchange resin, or by other conventional procedure, including precipitation of the hydrochloride or conversion of acid to an insoluble salt, such as the barium salt, isolation of this salt, and metathesis to the acid, or formation of monosodium glutamate and recovery thereof.

The cells of *Pseudomonas fluorescens, fragi, mildenbergii, putida, schuylkilliensis, ovalis,* and the like bacteria when properly trained elaborate enzyme systems which, we have now discovered, promote the conversion of citric acid in the presence of ammonia or ammonium ions to L-glutamic acid or its derivatives. These bacteria are grown in typical culture media. If citrate and ammonium ions are present in the media, we have found, the cells formed have an increased activity for promoting the changes here desired. After growth has been carried to a good level of viable cells, the cells are collected or concentrated in a reduced volume. For example, the medium is centrifuged to give a concentrate of cells. While these may be used as such, better, they are treated to render the active principles more readily available. They may, for example, be treated with ultrasonic vibrations, autolysed, or otherwise lysed. Treatment with an organic solvent, such as toluene or ethyl acetate, may be used to make the enzyme system more readily available. The cells, preferably treated cells, are added to the aqueous solution containing citrate and ammonium ions and the solution is desirably blanketed with an inert atmosphere, such as nitrogen, since yields then become better than when air is present. The mixture is agitated continuously or intermittently. In the best procedure a nicotinic acid-containing coenzyme is added to the solution.

The lysed cell suspensions commonly contain 0.1 to 1% or more of cell solids. These have a nitrogen content of about 10%. The suspension is conveniently proportioned to the citrate on the basis of either solids or nitrogen. Thus, from about 0.5 to about 5 grams or more of cell solids may be used per liter of citrate solution or about 0.05 to 0.5 gram of nitrogen in the cell material. The usual addition is 2 to 3 grams of cell solids per liter of 0.1 M citrate solution.

The solution containing citrate ions and ammonium ions may be prepared from citric acid which is treated with ammonia to the required pH level or with one or more moles of ammonia per mole of citric acid and, if necessary, with soda ash or sodium hydroxide until the pH of the solution has a value between 6 and 8.5. A potassium base may be used in place of the sodium base. In place of citric acid there may be used a salt of citric acid such as a sodium or potassium salt in which one or more of the hydrogens of citric acid have been replaced. The ammonium ion may be supplied by adding ammonia provided the correct pH level is then reached, or by adding an ammonium salt, such as ammonium chloride or sulfate. A particularly convenient salt is that having two ammonium ions and one sodium ion per citrate molecule.

When the citrate content of the solution has been substantially converted to glutamate, steps are taken to remove extraneous materials and to isolate product. Cells and other insoluble materials are removed, as by filtering. Since autolysate may contain some soluble proteins, it is usually desirable either to heat the solution to coagulate protein, usually after acidification, and then filter, or to heat the initial filtrate and filter the heated solution. The choice of succeeding steps is determined by the particular form of product desired. In one course of procedure strong acid, such as hydrochloric acid which is at least two normal, is added to cause formation of the hydrochloride of glutamic acid, which crystallizes and is separated. By another method only enough acid is added to the digested solution, to bring its pH to about 3. The adjusted solution is concentrated to a reduced volume, from which crystals of glutamic acid separate and are removed. Again monosodium glutamate may be recovered from the solution.

By yet another method the filtered solution is made strongly acid, as with hydrochloric acid. The acid solution is passed over a sulfonic cation exchange resin in hydrogen form. The resin is then eluted with dilute sodium hydroxide solution. The eluate is concentrated to dryness to give monosodium glutamate.

Typical prepaartions are described in the following illustrative examples:

Example 1

(a) A medium was prepared from 88 grams of crystalline trisodium citrate (5.5 $H_2O$), 0.48 g. of ammonium sulfate, 0.22 g. of potassium dihydrogen phosphate, 0.05 g. of magnesium sulfate crystals, and water to make 2000 ml. To this was added ferrous ammonium sulfate to supply one part per million of iron. This solution was sterilized and inoculated with *Pseudomonas fluorescens*. The culture was then maintained at 30° C. with agitation and aeration for 24 hours. Carbon dioxide was also passed in to hold the pH at about 7. There were then found by a plate count $2 \times 10^8$ variable cells per ml. The culture was centrifuged at 5° C. to concentrate the cells, which were washed twice with cold 0.9% saline solution and resuspended in water to give a suspension containing 0.5 mg. cell nitrogen per ml. A portion of 25 ml. of the suspension was treated in an ultrasonic vibrator at 5°–6° C. for 10 minutes at 10,000 cycles per second.

(b) This lysate was added to 20 ml. of a solution of a sodium diammonium citrate at pH 8. Thereto was added one ml. of a preparation of coenzyme from beef liver. The total volume was then 46 ml. of solution having a citrate content of 0.1 molar. The mixture was blanketed with nitrogen and agitated at 30° C. for 66 hours. The reaction mixture was heated at 120° C. for two minutes in an autoclave, was cooled, and was centrifuged.

The supernatant liquor was adjusted to pH 3.5 with dilute hydrochloric acid and concentrated under reduced pressure; glutamic acid crystallized out. It had a melting point of 187° C. and was identical with an authentic sample of L-glutamic acid, as shown by mixed melting point. The specific rotation was $-32°$ at 25° C. in 5 N HCl solution. The product was thus identified as the L-form.

Example 2

The cells were grown, harvested and washed as described in Example 1. A portion of 35 ml. of a suspension of washed cells in water, containing 0.605 mg. cell nitrogen/ml. was treated in an ultrasonic vibrator at 10,000 cycles/sec. for 8 minutes at 8° C. Thirty ml. of the opalescent homogenate was added to 25 ml. of a solution containing diammonium sodium citrate and a liver coenzyme concentrate in a reaction vessel. The final concentration of citrate was 0.1 M and that of the coenzyme concentrate was 0.182 mg./ml. The reaction vessel was flushed with nitrogen and then tightly closed. The reaction mixture was then incubated at 30° C. for 66 hours. A 2 ml. aliquot was taken, autoclaved at 120° C. for 2 minutes, cooled, and centrifuged, the supernatant liquid being then suitably diluted for analysis. Citrate and ammonia determinations indicated that over 98% of the citrate and about 50% of the available ammonia had been utilized. Microbiological assay, however, showed only 80% of the citrate taken up could be accounted for as L-glutamate. The total reaction mixture was then autoclaved at 120° C. for 2 minutes, cooled, and centrifuged. The supernatant liquor was acidified to pH 3.0 with 5 N hydrochloric acid. It was then extracted with ether continuously in a liquid-liquid extractor for 8 hours. The ether phase was dried and evaporated to dryness. The residue was recrystallized twice from ethyl acetate to give glistening prisms having a melting point of 159–60° C. and giving a mixed melting point with an authentic sample of L-glutamic acid anhydride prepared from L-glutamic acid of 159–60° C.

The aqueous phase, after the ether extraction was completed, was concentrated in vacuo to a suitable volume. On standing a crystalline solid slowly separated which was collected and recrystallized from water. The material was found to be identical with a genuine sample of L-glutamic acid.

Example 3

The cells were grown, harvested, and washed as described in Example 1. A suspension of washed cells in water, containing 0.485 mg. of cell nitrogen per ml., was prepared. A portion of 50 ml. of all suspension was mixed with 50 ml. of 0.12 M triammonium citrate solution, 19 mg. of coenzyme concentrate, and 10 ml. of 0.4 M tris-(hydroxymethyl)aminomethane-hydrochloric acid buffer solution in a reaction vessel. The final pH was 8. While the vessel was being flushed with nitrogen, 4 ml. of reagent grade toluene was added to the suspension. The flask was then tightly stoppered and incubated with gentle agitation at 35° C. for 40 hours. Microbiological assay indicated that more than 90% of the citrate had been converted to L-glutamic acid. The reaction mixture was autoclave for 2 minutes at 120° C., cooled, and centrifuged. The supernatant liquid was adjusted to pH 3.1 and then concentrated to a suitable volume under reduced pressure. On standing in the refrigerator, crystals were obtained which were found to be identical with genuine L-glutamic acid.

Example 4

The cells were grown, harvested, and washed as described in Example 1. A portion of 30 ml. of a suspension of washed cells in water, containing 0.805 mg. of cell nitrogen per ml., was treated in an ultrasonic vibrator at 10,000 cycles/sec. for 15 minutes at 6° C. The resulant homogenate was then mixed with 50 ml. of aqueous 0.24 M triammonium citrate solution, 10 ml. of aqueous 0.022 M $MgSO_4 \cdot 7H_2O$ solution, and 20 ml. of 0.2 M tris-(hydroxymethyl)aminomethane-hydrochloric acid buffer solution at pH 8.0 in a reaction vessel. The vessel was then thoroughly flushed with nitrogen and stoppered tightly. The reaction mixture was incubated for 68 hours with gentle shaking at 30° C. Microbiological assay indicated that 55% of the citrate had been converted to L-glutamate at this time. Crystals of L-glutamic acid were isolated as in previous examples and proved to be identical with a pure, authentic sample of L-glutamic acid.

Example 5

The cells were grown, harvested and washed according to the procedure described in Example 1. A portion of 35 ml. of a suspension of washed cells in water containing about 0.556 mg. of cell nitrogen per ml. was treated in an ultrasonic vibrator at 10,000 cycles per sec. at 6° C. for 10 minutes. A yeast extract was prepared by shaking 10 g. of fresh yeast autolysate, previously adjusted to pH 7.0, in 20 ml. of 0.2 M tris-(hydroxymethyl)-aminomethane-hydrochloric acid buffer solution at pH 8.0 and 10 ml. of water at 25° C. for 1 hour, the suspension being centrifuged to give an opalescent supernatant liquor. A portion of 20 ml. of the sonic homogenate and 20 ml. of the yeast extract were mixed with 10 ml. of 0.22 M diammonium sodium citrate solution and 5 ml. of water in a reaction vessel. The vessel was flushed well with $N_2$, tightly stoppered, and then incubated at 37° C. for 42 hours. Microbiological assay indicated that 38% of the citrate had been converted at that time to L-glutamate.

Example 6

(a) A medium was prepared as in Example 1. It was inoculated with a strain of Xanthomonas (probably *Xanthomonas citri*). *Xanthomonas citri* is readily obtained from the Higher Education and Scientific Bureau, Ministry of Education, Tokyo, Japan, where it is registered on page 184 of the "General Catalogue of the Cultures of Microorganisms in the Japanese Collection, Tokyo, Japan" (1953). The inoculated medium was agitated with aeration at 30° C. Carbon dioxide was also passed in to hold the pH at about 7.0. Good growth was obtained in 24 hours. The culture was centrifuged at 5° C. and the cell paste was washed twice with physiologically normal saline solution and resuspended in water to give a suspension containing 0.55 mg. of cell nitrogen per ml. A portion of 35 ml. of this suspension was treated in an ultrasonic vibrator at 5° C. for 10 minutes at 10,000 cycles/sec.

(b) A portion of 30 ml. of this lysate was added to 24 ml. of a 0.23 molar solution of sodium diammonium citrate at pH 8. Thereto was added a portion of 1.5 ml. of a preparation of coenzyme from pig liver. The mixture was blanketed with nitrogen and agitated at 30° C. for 70 hours. The reaction mixture was heated at 120° C. for two minutes in an autoclave, was then cooled, and was centrifuged.

The supernatant was concentrated under reduced pressure and adjusted with dilute hydrochloric acid to a pH of 3.1. On being cooled in a refrigerator, the concentrated solution yielded crystals, which melted at 187° C. These consisted of L-glutamic acid. Mixtures with authentic L-glutamic acid gave no depression in melting point. The specific rotation at 1% in 5 N hydrochloric acid solution at 25° C. was −32°.

In the same way there may be used *Xanthomonas begoniae* or *vasculorum*. *Xanthomonas begoniae* is conveniently obtained from the American type culture collection, Washington, D. C., where this organism is registered under No. 8718.

We claim:

1. A process for preparing L-glutamic acid and derivatives which comprises treating at a temperature between 20° and 40° C. an aqueous solution having a pH between 6 and 8.5 and containing about 0.05 to 0.15 mole of citrate ions per liter and ammonium ions in an amount at least molecularly proportional to the said citrate ions with cells of *Pseudomonas fluorescens* which have been cultured in a medium containing citrate and ammonium ions, said treating being continued until the citrate content is substantially converted to glutamate, and recovering the glutamate content thereof.

2. A process for preparing L-glutamic acid and derivatives which comprises treating at temperatures between 20° and 40° C. under substantially anaerobic conditions an aqueous solution having a pH between 6 and 8.5 and containing about 0.05 to about 0.15 mole of citrate ions per liter and ammonium ions in an amount at least molecularly proportional thereto with cells of *Pseudomonas fluorescens* which have been cultured in a medium containing citrate and ammonium ions and autolyzed, said treating being continued until the citrate content is substantially converted to glutamate, and recovering the glutamate content thereof.

3. A process for preparing L-glutamic acid and derivatives which comprises treating at temperatures between 20° and 40° C. and under substantially anaerobic conditions an aqueous solution having a pH between 6 and 8.5 and containing about 0.05 to 0.15 mole of citrate per liter and ammonium ions in an amount at least molecularly proportional thereto with cells of *Pseudomonas fluorescens* which have been cultured in a medium containing citrate and ammonium ions and lysed, and with an added reversibly oxidizable and reducible nicotonic acid-containing coenzyme, said treating being continued until the citrate content is substantially converted to glutamate, and recovering the glutamate content thereof.

4. The process of claim 3 in which the coenzyme is obtained from yeast.

5. The process of claim 3 in which the coenzyme is obtained from liver.

6. A process for preparing L-glutamic acid and derivatives which comprises treating at 20° to 40° C. an aqueous solution containing citrate and ammonium ions, the latter ions being at least molecularly proportional to the former, said solution having a pH value from 6 to 8.5, with cells of a bacterium selected from the group consisting of *Pseudomonas fluorescens* and *Xanthomonas begoniae*, until the citrate content of said solution is substantially converted to glutamate, and recovering the glutamate content thereof.

7. The process of claim 6 in which the process is carried out under anaerobic conditions.

8. A process for preparing L-glutamic acid and derivatives which comprises treating at a temperature from about 20° to 40° C. an aqueous solution containing citrate and ammonium ions in a proportion of at least one mole thereof per mole of citrate ions, said solution having a pH value from 6 to 8.5 with cells of bacteria selected from the group consisting of *Pseudomonas fluorescens* and *Xanthomonas begoniae*, and with a reversibly oxidizable and reducible nicotinic acid-containing coenzyme, until the citrate content is substantially converted to glutamate, and recovering the glutamate content thereof.

9. The process of claim 8 in which the said bacterial cells are viable.

10. The process of claim 8 in which the process is carried out under anaerobic conditions.

11. The process of claim 8 wherein the said cells have been cultured in a medium containing citrate and ammonium ions.

12. The process of claim 8 in which in which the coenzyme is obtained from liver.

13. The process of claim 8 in which the coenzyme is obtained from yeast.

14. A process for preparing L-glutamic acid and derivatives which comprises treating an aqueous solution having a pH between 6 and 8.5 and containing between about 0.01 and 0.25 moles of citrate ions per liter and ammonium ions in an amount at least molecularly proportional to the said citrate ions with cells of *Pseudomonas fluorescens* and with a reversibly oxidizable and reducible nicotinic acid-containing coenzyme, at a temperature between 20° and 40° C., under anaerobic conditions, until the citrate content is substantially converted to glutamate, and recovering the glutamate content thereof.

15. The process of claim 14 wherein the said cells have been treated with sonic vibrations.

16. The process of claim 14 wherein the said cells have been autolyzed.

17. The process of claim 14 wherein the said cells have been autolyzed with toluene.

18. The process of claim 14 wherein viable *Pseudomonas fluorescens* cells are employed.

19. A process for preparing L-glutamic acid and derivatives which comprises treating an aqueous solution having a pH between 6 and 8.5 and containing between about 0.01 and 0.25 moles of citrate ions per liter and ammonium ions in an amount at least molecularly proportional to the said citrate ions with cells of *Xanthomonas begoniae* and with a reversibly oxidizable and reducible nicotinic acid-containing coenzyme, at a temperature between 20° and 40° C., under anaerobic conditions, until the citrate content is substantially converted to glutamate, and recovering the glutamate content thereof.

References Cited in the file of this patent

Porter: Bacterial Chemistry and Physiology, Wiley, 1946, pages 575–578, and 807.

Annual Review of Biochemistry, vol. XVIII, 1949, page 543.

Sumner et al.: The Enzymes, Academic Press, vol. 1, part 2, (1951): pages 1063–1065, vol. 2 part 2, 1952, pages 1117–1119.

Chemical Abstracts 32:2966(9) Adler et al., Enzyme Synthesis of Glutamic Acid.

Advances in Enzymology, vol. 15, pages 184 to 186, 224.